May 3, 1949.                O. L. BRANSON                2,469,325
                       CONVERSION OF HYDROCARBONS
                           Filed May 4, 1946
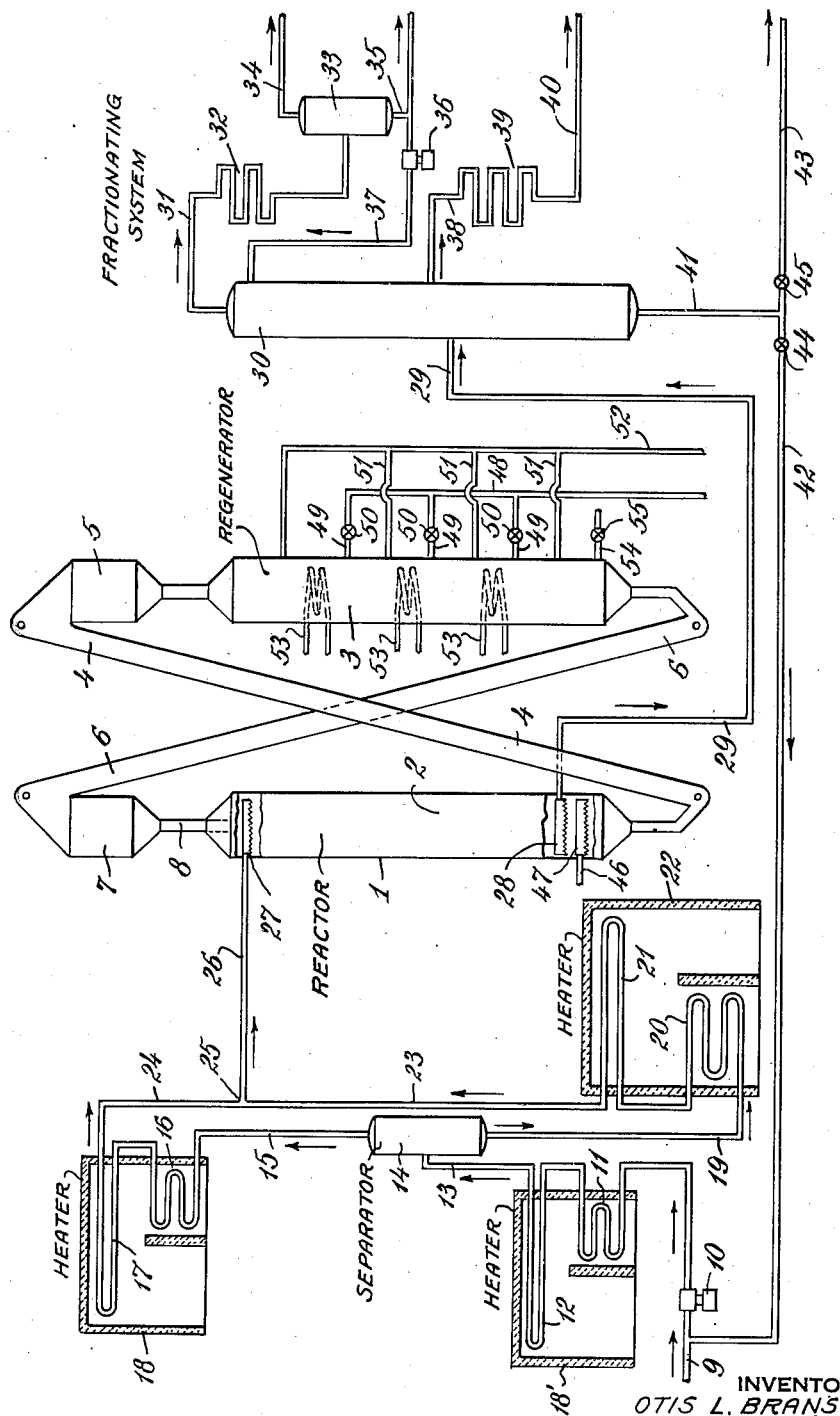
INVENTOR
OTIS L. BRANSON
BY Francis J. Johnston
AGENT or ATTORNEY Patented May 3, 1949

2,469,325

UNITED STATES PATENT OFFICE 2,469,325

CONVERSION OF HYDROCARBONS

Otis L. Branson, Beaumont, Tex., assignor to Socony-Vacuum Oil Company, Incorporated, New York, N. Y., a corporation of New York Application May 4, 1946, Serial No. 667,299

3 Claims. (Cl. 196—52)

This invention relates to the conversion of petroleum hydrocarbons to gasoline of high quality in the presence of a solid contact mass and, more particularly, to the conversion of long boiling range petroleum stocks to gasoline of high quality.

The commercial development of the process for converting petroleum hydrocarbons to gasoline in the presence of a solid contact mass has taken three forms. The older one utilizes the contact mass in the form of a fixed bed. When the contact mass is contaminated the conversion operation is interrupted and the contact mass regenerated in situ. A later developed method employs the contact material in the form of particles of sufficiently small size to permit the particles of contact material to be suspended in and carried by the reaction vapors while the reaction is carried out in a vessel wherein the contact material is maintained in a condition of hindered settling. Spent contact material is withdrawn from the reactor and is regenerated by treating with air for combustion under similar conditions of hindered settling and returned to the reactor. The third method utilizes the contact material in the form of particles of larger size than in the second method and in the form of a moving bed or descending substantially compact column into which the hydrocarbons to be reacted are passed. Spent contact material is discharged from the bottom of the column and passed through a similar arrangement wherein it is contacted with air for a high temperature regeneration. Thereafter the contact material is returned to the reactor. The present invention is particularly concerned with operation of the last type.

It is to be observed that in operations of the last type the catalyst, heretofore, has been heated above the optimum operating temperature in order to supply additional heat to the charge stock which enters the reactor at a temperature below the optimum. Furthermore, in present operations catalyst circulation cannot be lowered below the point at which the additional heat supplied by the catalyst is less than that required to raise the temperature of the oil entering the reactor to the reaction temperature. As a consequence, flexibility and independence of catalyst and oil charge rates cannot be achieved.

The contact material employed in this method of converting petroleum hydrocarbons is known in the art as natural or synthetic clays and may comprise natural clays such as fullers' earth, activated clays and synthetic compositions of alumina and/or silica, with or without related materials, produced by any of numerous known means and may be in the form of granules, formed pellets, beads and the like. Such materials may themselves be catalytic to the desired reaction or may be impregnated with or act as carriers or supports for other materials such as certain metallic oxides and the like, which are catalytic or whose presence is desired for the purpose of the reaction.

The present invention provides a method whereby a long boiling range mixture of hydrocarbons of which a substantial portion boils above the reaction temperature range can be effectively converted to gasoline of high quality. In other words, the dew-point of the mixture is above the reaction temperature. Such a mixture may comprise, for example, residua and relatively light gas oil. For example, a mixture of deasphalted East Texas residuum and gas oil of say 20–30 degrees A. P. I. in which the residuum is present to the extent of say about 15 to about 50 per cent can be treated by the novel method.

The invention may be understood more readily by reference to the drawing, the single figure of which shows in diagrammatic form the lay-out of equipment utilized in the practice of the present invention. In this drawing 1 is a reactor containing a substantially compact downwardly moving column of particle form solid contact mass material designated by numeral 2; 3 is a similarly operated regenerator. Elevator 4 serves to move spent contact mass material from reactor 1 into hopper 5 from whence it is fed through regenerator 3. Elevator 6 moves regenerated contact mass material into hopper 7 from whence it is fed through feed pipe 8 into reactor 1. Charge oil for the operation comprises, in general, a material of long boiling range containing fractions boiling below the desired reaction temperature and a substantial portion boiling above the desired reaction temperature. For example, the charge oil may be a mixture containing about 15 to about 50 per cent of deasphalted residua and the balance gas oil of say 30–20 degrees A. P. I. gravity. The charge oil is introduced through pipe 9 and is forced by pump 10 through heating coils 11 and 12 in furnace 18' where it is heated to a temperature of the order of the reaction temperature. At the selected temperature control of the dew-point is obtained with the result that the vaporous portion of the charge has a dew-point somewhat greater than the reaction temperature. Thus, for example, the charge oil may be heated to a temperature of about 800 to about 900 degrees Fahrenheit. The heated oil passes through pipe 13 to separator wherein the desired separation of the heated oil into a vaporous portion and a liquid portion is effected. In this separation a portion of the higher boiling constituents is vaporized with the lower boiling constituents. The vaporous portion passes through pipe 15 and is superheated in coils 16 and 17 in furnace 18. For example, the vapors separated at 800 to 900 degrees Fahrenheit may be superheated to say 950 to 1,000 degrees Fahrenheit. That is, the vapors are heated to a temperature about 150 to about 200 degrees Fahrenheit higher than that at which the separator is operating. The portion of the charge oil liquid at the temperature of separation passes through pipe 19 and is superheated in coils 20 and 21 of furnace 22. Conditions are maintained in this portion of the operation to superheat the portion of the charge oil liquid at the temperature of the separator to a temperature about 100 to about 200 degrees Fahrenheit higher than the temperature of the separator without substantial coking, etc. or cracking. The superheated liquid portion of the charge oil in a substantially uncracked state and free from any substantial amount of coke passes through pipe 23 as a superheated liquid to join the superheated vapors coming from coil 17 by way of pipe 24 at 25. The mixture of superheated vapors and superheated oil free from substantial amounts of coke pass through pipe 26 to be introduced into reactor 1 through distributor 27 located in the upper portion of the reactor 1. The hydrocarbons whether in vapor or liquid state move concurrently with the contact mass material downwardly through the reactor 1. The vaporous materials are withdrawn from reactor 1 through collector 28 to pass through pipe 29 to fractionator 30. In fractionator 30 the vaporous products of conversion are separated into gasoline and lower boiling materials which are withdrawn through pipe 31. The gasoline is condensed in cooler 32 and the gasoline and normally gaseous materials collected in receiver 33. The normally gaseous material is withdrawn through line 34 and the liquid product through 35. A portion of the liquid product withdrawn through pipe 35 may be passed by pump 36 and pipe 37 to fractionator 30 for use as reflux. An intermediate fraction may be withdrawn from fractionator 30 through pipe 38, passed through condenser 39 and withdrawn through pipe 40. The highest boiling fraction is withdrawn from fractionator 30 through pipe 41 and may be recycled through pipe 42 or withdrawn from the operation through pipe 43, both of which are controlled by valves 44 and 45.

In order to prevent the escape of hydrocarbons other than "coke" from the reactor a purge material such as steam or other inert gas is introduced through pipe 46 to the distributor 47 located near the contact mass material outlet of the reactor 1.

Spent contact material passes through elevator 4 into hopper 5 and thence into regenerator 3 wherein it is contacted with air for the purpose of burning off the combustible contaminating material deposited upon it. This regenerative air or other suitable oxidizing medium is introduced into the regenerator in any suitable manner as by manifold 48 and pipes 49 controlled by valves 50. The gasses produced in regeneration are removed through pipes 51 and manifold 52. The temperature of the regenerator may be controlled in known manner by fluid heat transfer medium introduced into the regenerator in appropriate cooling coils in indirect heat transfer as shown at 53. When desired a purge gas may be introduced into the regenerator at a point near the outlet for regenerated contact mass material as by pipe 54, controlled by valve 55. The hot regenerated contact mass material withdrawn from the regenerator in heated condition is delivered through elevator 6, hopper 7 and feed pipe 8 into the top of the reaction column. The temperature of this material and its quantity together with the temperature of the incoming charge are balanced so as to provide the desired amount of heat from both sources to maintain the desired reaction temperature within reactor 1.

Several advantages are concomitant with operation in the manner described. One advantage derived from the present method of operation is the reduction in coking at the higher temperatures of superheat employed.

In addition, in contradistinction to present practice flexibility and independence of catalyst and oil charge rates are achieved. The novel method provides for preheating the charge and the catalyst to the optimum reaction temperature before bringing the charge and catalyst into contact. Flexibility is achieved because the rates of flow of both catalyst and charge stock can be varied over the full operating range determined by the respective portions of the equipment without affecting the average reaction temperature. Thus, disadvantages of present operations which have been pointed out hereinbefore have been overcome by the novel method.

I claim:

1. The method of maintaining a substantially uniform optimum cracking temperature in a moving bed catalytic cracking reactor during the catalytic conversion of a long boiling range mixture of hydrocarbons into high quality gasoline which comprises heating solid catalytic contact mass material in an enclosed regenerating zone to a catalytic cracking temperature, heating a charge oil containing a substantial fraction boiling above about 800° F. to about 900° F. to a temperature of about 800° F. to about 900° F., separating said heated oil into a portion vaporous at a temperature of about 800° F. to about 900° F. and a portion liquid at a temperature of about 800° F. to about 900° F., separately reheating said vaporous portion and said liquid portion of the charge oil to about 950° F. to about 1000° F., whereby superheated vapors and superheated liquid are obtained without substantial cracking, free from any substantial amount of coke, and free from substantial amounts of the products of thermal cracking, introducing said heated contact mass material at about the temperature of catalytic cracking as a compact column into a conversion zone, introducing said superheated vapors and superheated liquid into said compact column at a point in the column near that at which said contact mass material enters said conversion zone, the amount and temperature of said contact mass material and the amount and temperature of said superheated vapors and said superheated liquid being proportioned to maintain the desired catalytic cracking temperature substantially uniform throughout said compact column in said conversion zone whereby the rates of flow of both catalytic contact mass material and said superheated vapors and liquid may be varied over the full operating range of the equipment without materially affecting the average cracking temperature, flowing said superheated vapors and superheated liquid concurrently with said contact mass material, removing vaporous products of conversion from said column at a point near that at which said contact mass material leaves the conversion zone, and fractionating said conversion products, whereby high quality gasoline is produced from long boiling range charge oil without the production of substantial amounts of the products of thermal cracking.

2. The method of maintaining a substantially uniform optimum cracking temperature in a moving bed catalytic cracking reactor during the catalytic conversion of a long boiling range mixture of hydrocarbons into high quality gasoline which comprises heating solid catalytic contact mass material in an enclosed regenerating zone to a catalytic cracking temperature, heating a charge oil comprising a mixture of deasphalted residuum and gas oil of 20–30° A. P. I. in which the residuum is about 15 to about 50 per cent of the mixture to a temperature of about 800° F. to about 900° F., separating said heated oil into a portion vaporous at a temperature of about 800° F. to about 900° F. and a portion liquid at a temperature of about 800° F. to about 900° F., separately reheating said vaporous portion and said liquid portion of the charge oil to about 950° F. to about 1000° F., whereby superheated vapors and superheated liquid are obtained without substantial cracking, free from any substantial amount of coke, and free from substantial amounts of the products of thermal cracking, introducing said heated contact mass material at about the temperature of catalytic cracking as a compact column into a conversion zone, introducing said superheated vapors and superheated liquid into said compact column at a point in the column near that at which said contact mass material enters said conversion zone, the amount and temperature of said contact mass material and the amount and temperature of said superheated vapors and said superheated liquid being proportioned to maintain the desired catalytic cracking temperature substantially uniform throughout said compact column in said conversion zone whereby the rates of flow of both catalytic contact mass material and said superheated vapors and liquid may be varied over the full operating range of the equipment without materially affecting the average cracking temperature, flowing said superheated vapors and superheated liquid concurrently with said contact mass material, removing vaporous products of conversion from said column at a point near that at which said contact mass material leaves the conversion zone, and fractionating said conversion products, whereby high quality gasoline is produced from long boiling range charge oil without the production of substantial amounts of the products of thermal cracking.

3. The method of maintaining a substantially uniform optimum cracking temperature in a moving bed catalytic cracking reactor during the catalytic conversion of a long boiling range mixture of hydrocarbons into high quality gasoline which comprises heating solid catalytic contact mass material in an enclosed regenerating zone to a catalytic cracking temperature, heating to about 800° F. to about 900° F. a charge oil containing a substantial fraction boiling above about 800° F. to about 900° F., separating said heated oil into a portion vaporous at 800° F. to 900° F. and a portion liquid in the aforesaid temperature range, separately reheating said vaporous portion to a temperature about 150° F. to about 200° F. higher than the aforesaid temperature of separation, separately reheating said liquid portion to a temperature about 100° F. to about 200° F. higher than the temperature of separation whereby superheated vapors and superheated liquid are obtained free from substantial amounts of coke and free from substantial amounts of the products of thermal cracking, introducing said heated contact mass material at about the reaction temperature as a compact column into a conversion zone, introducing said superheated vapors and superheated liquid into said compact column at a point near that at which said contact mass material enters said conversion zone, the amount and temperature of said contact mass material and the amount and temperature of said superheated vapors and superheated liquid being proportioned to maintain the desired catalytic cracking temperature substantially uniform throughout said compact column in said conversion zone whereby the rates of flow of both catalytic contact mass material and said superheated vapors and liquid may be varied over the full operating range of the equipment without materially affecting the average cracking temperature, flowing said superheated vapors and superheated liquid concurrently with said contact mass material, removing vaporous products of conversion from said column at a point near that at which said contact mass material leaves the conversion zone, and fractionating said conversion products, whereby high quality gasoline is produced from long boiling range charge oil without the production of substantial amounts of the products of thermal cracking.

OTIS L. BRANSON.

REFERENCES CITED

The following references are of record in the file of this patent:

UNITED STATES PATENTS

| Number | Name | Date |
| --- | --- | --- |
| 2,340,974 | Myers | Feb. 8, 1944 |
| 2,356,611 | Peters | Aug. 22, 1944 |
| 2,379,711 | Hemminger | July 3, 1945 |